(12) United States Patent
Deng

(10) Patent No.: US 8,093,831 B2
(45) Date of Patent: Jan. 10, 2012

(54) VOLTAGE CONVERTER WITH FIRST PUSH

(76) Inventor: Qi Deng, Wuxi (CN)

(*) Notice: Subject to any disclaimer, the term of this patent is extended or adjusted under 35 U.S.C. 154(b) by 357 days.

(21) Appl. No.: 12/544,277

(22) Filed: Aug. 20, 2009

(65) Prior Publication Data

US 2011/0043174 A1    Feb. 24, 2011

(51) Int. Cl.
*G05F 1/00* (2006.01)
(52) U.S. Cl. ......... 315/291; 320/114; 323/266; 323/907
(58) Field of Classification Search .................... 315/92, 315/158, 194, 291, 307, 311; 323/222, 224, 323/226, 259, 268, 289, 320, 906, 907; 320/114, 320/136, 152, 140
See application file for complete search history.

(56) References Cited

U.S. PATENT DOCUMENTS

| | | | | |
|---|---|---|---|---|
| 4,395,680 A * | 7/1983 | Slutzky | ......................... | 324/392 |
| 5,798,577 A * | 8/1998 | Lesesky et al. | .............. | 307/10.7 |
| 5,850,137 A * | 12/1998 | Takimoto et al. | ............ | 320/164 |
| 5,896,015 A * | 4/1999 | Mader | ........................... | 315/291 |
| 7,432,690 B2 * | 10/2008 | Williams et al. | .............. | 323/266 |

* cited by examiner

*Primary Examiner* — Rajnikant Patel
(74) *Attorney, Agent, or Firm* — Oakwood Law Group, LLP; Eli Weiss; Jie Tan

(57) ABSTRACT

A boost DC/DC power converter is disclosed that has a low voltage source, an inductor and a switching device that forms a series loop, a diode in series with a capacitor coupled across the switching device, a voltage divider coupled across the capacitor and a pulse width modulator that is coupled to the voltage divider. The boost converter includes a first push controller coupled across the switching device to provide a first push voltage of sufficient magnitude to turn the switching device on where the low voltage source by itself is not capable of generating a voltage of sufficient magnitude to operate the switching device.

16 Claims, 8 Drawing Sheets

VOLTAGE CONVERTER WITH FIRST PUSH

BACKGROUND OF THE INVENTION

1. Field of the Invention

The present invention relates generally to a voltage converter and more specifically to switched low voltage converters that can operate when provided with an input voltage that is less than the threshold voltage of the switching devices used in the voltage converter.

2. Description of the Related Art

In today's electrical devices and equipment, voltage converters are widely used to convert an output voltage of a single power source, such as a battery, to a few voltage rails that, in turn, power different functional blocks within a system.

One example is a mobile handset powered by a single cell Li-Ion battery with a 3.6V nominal output voltage. Within the mobile handset, there are usually 3 to 5 voltage rails, such as 5V, 3.3V, 2.5V, 1.8V, and 1.5V, etc., that are needed to power different functional blocks within the handset. All these voltage rails are converted from the Li-Ion battery. Because some of the voltages, such as 5V, are higher than the nominal output voltage of the single-cell Li-Ion battery, voltage converters with a step-up or "boost" topology, are used.

A boost converter is a switching mode converter that typically contains a diode and an energy storage element. An example of a conventional boost converter is shown in FIG. 1. The boost converter 10 includes a high voltage power source (HV_BAT) 12, an energy storage element in the form of an inductor (L1) 14 connected in series with the HV_BAT, a switching device (SW_1) 16 connected between the inductor and ground (GND), a diode (D1) 17 connected in series with (L1), a capacitor (C1) 18 connected between D1 and GND, and a voltage divider, a first resistor (R1) 20 and a second resistor (R2) 22, that is also connected between D1 and GND. The voltage across the voltage divider is the output voltage ($V_{OUT}$) of the voltage converter that is provided to a load (RL) 24. The voltage at the connection between R1 and R2 provides an input voltage to a Pulse Width Modulator (PWM) 26 that provides an input signal (PWM_SW) to the control terminal of switching device (SW_1). The PWM obtains power from terminals that are connected between D1 and GND.

When the power source, HV_BAT is first attached to the converter, a voltage $V_D$ appears between D1 and the load ($R_L$). This "first" $V_D$ serves two purposes: it provides an intermediate "first push" voltage that is required to activate the internal PWM block, and it provides the "initial" output voltage, $V_{OUT}$, to the load ($R_L$). A constant $V_{OUT}$ is achieved by using the PWM to switch the switching device SW_1 on and off to control the amount of energy stored in L1 and C1. The PWM block uses the voltage at the junction between R1 and R2 ($V_{FB}$) to determine the duty cycle of the PWM output signal. When the desired voltage (determined by the values of R1 and R2) is obtained, the duty cycle of the PWM stabilizes and the output of the boost converter is a constant output voltage at the desired level.

For a boost converter to operate, the initial output of the PWM must be at a sufficient level ($V_{TH}$) to switch SW_1 ON. $V_{TH}$ is defined by the nature of the switch. After the SW_1's "first switch on," the boost converter starts operation normally, and its output voltage $V_{OUT}$ eventually reaches a constant voltage required by the load $R_L$. If $V_{TH}$ is insufficient, the SW_1 will not be switched on the first time, as a result, the boost converter illustrated in FIG. 1 will not start. In a typical semiconductor based boost converter, $V_{TH}$ is between 0.7V and 1.0V, depending upon the technology of the switching device (MOSFET, bipolar transistor, etc.) used in the voltage converter. This means the power source has to have an output of at least 0.7V to 1.0V.

Renewable power sources can be used to replace environmentally hazardous chemical and electrochemical based energy sources, such as a variety of Li-Ion, Li-Polymer, NiMH, and NiCd batteries, which are still being widely used in mobile handsets and other battery-powered consumer and commercial devices and equipment as the primary source of energy. A promising energy source is the solar cell. However, a typical single solar cell outputs a voltage that does not exceed 0.3V, which is significantly below the 0.7V to 1.0V $V_{TH}$ of a typically switching element in conventional voltage converters.

Research is underway to develop semiconductor processing technologies on which ultra low threshold switching devices (i.e. switching devices with thresholds below 0.3V) can be made. However, even if such new semiconductor processing technologies can indeed be developed, the lower the threshold voltage becomes, the more complicated, and therefore more costly the processing technology is likely to become. In addition, no matter how low the threshold voltage of the switching devices becomes, conventional topologies cannot achieve a voltage converter that has a zero voltage threshold.

SUMMARY OF THE INVENTION

In an embodiment of the invention the low voltage converter is a boost converter that include a "first push" stage. The "first push" stage provides an initial push voltage enabling the switching device within the boost converter to commence switching irrespective of the voltage level of the power source. The "first push" stage includes a zero-voltage-input switching device to generate the initial "first push".

In an embodiment of the invention the low voltage power source can be a single solar cell.

In an embodiment of the invention the low voltage converter uses an isolated topology such as a flyback topology or a forward topology.

In an embodiment of the invention the low voltage power converter uses conventional semiconductor processes.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings wherein similar reference numerals in the various FIGS. Relate to similar parts.

DESCRIPTION OF THE INVENTION

Turning now to the drawings, embodiments of low voltage converters in accordance with the principles of the invention are shown. The low voltage converters are boost converters that include a first push block, which provides an initial voltage capable of ensuring that regardless of how low the power source voltage is, the voltage of the very first PWM pulse applied at the control terminal of the switching device, can overcome the threshold voltage of the switching device to turn it on the very first time.

Basic Architecture

Figure 1:
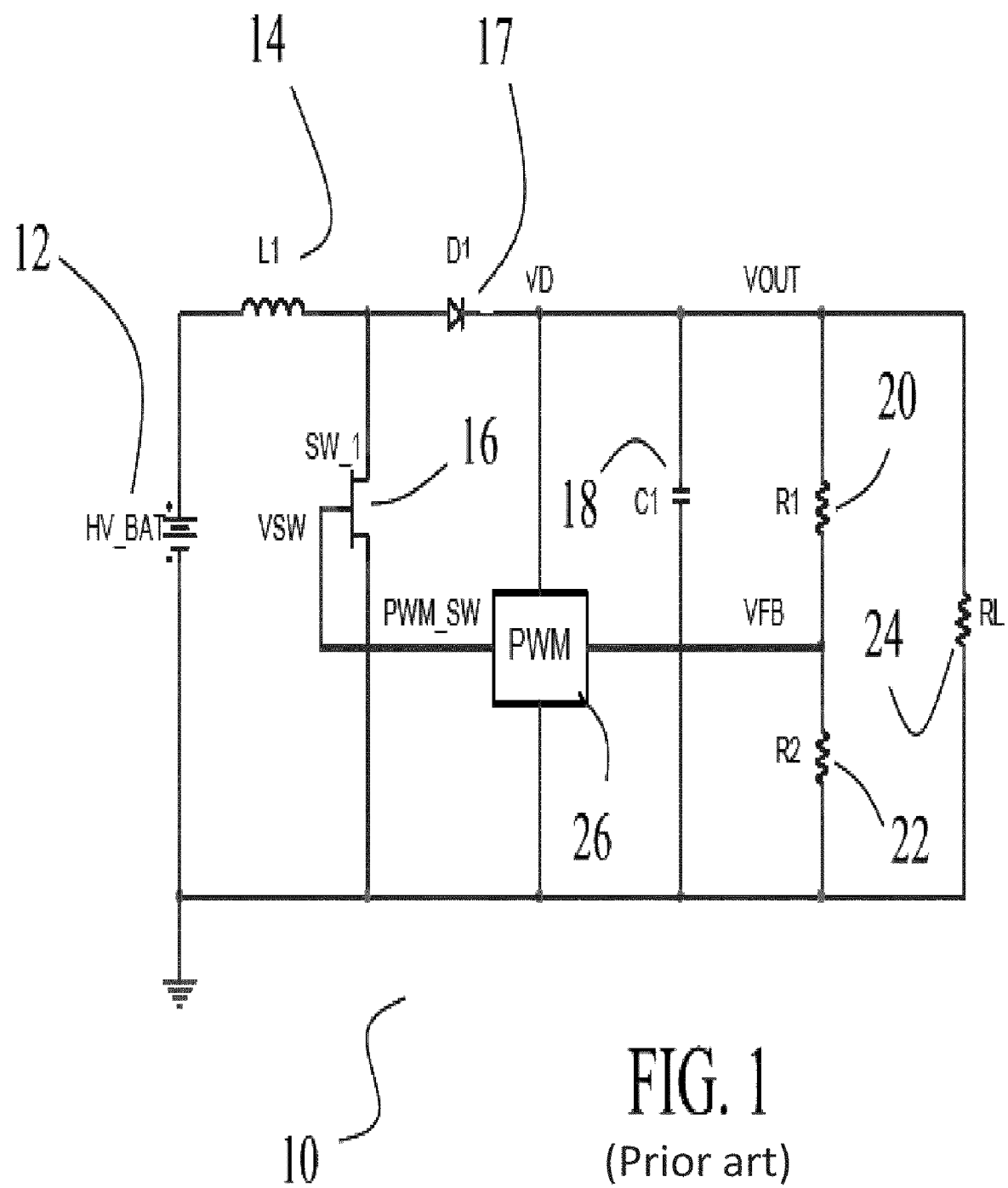
FIG. 1 is a circuit diagram of a conventional boost converter.
Figure 2:
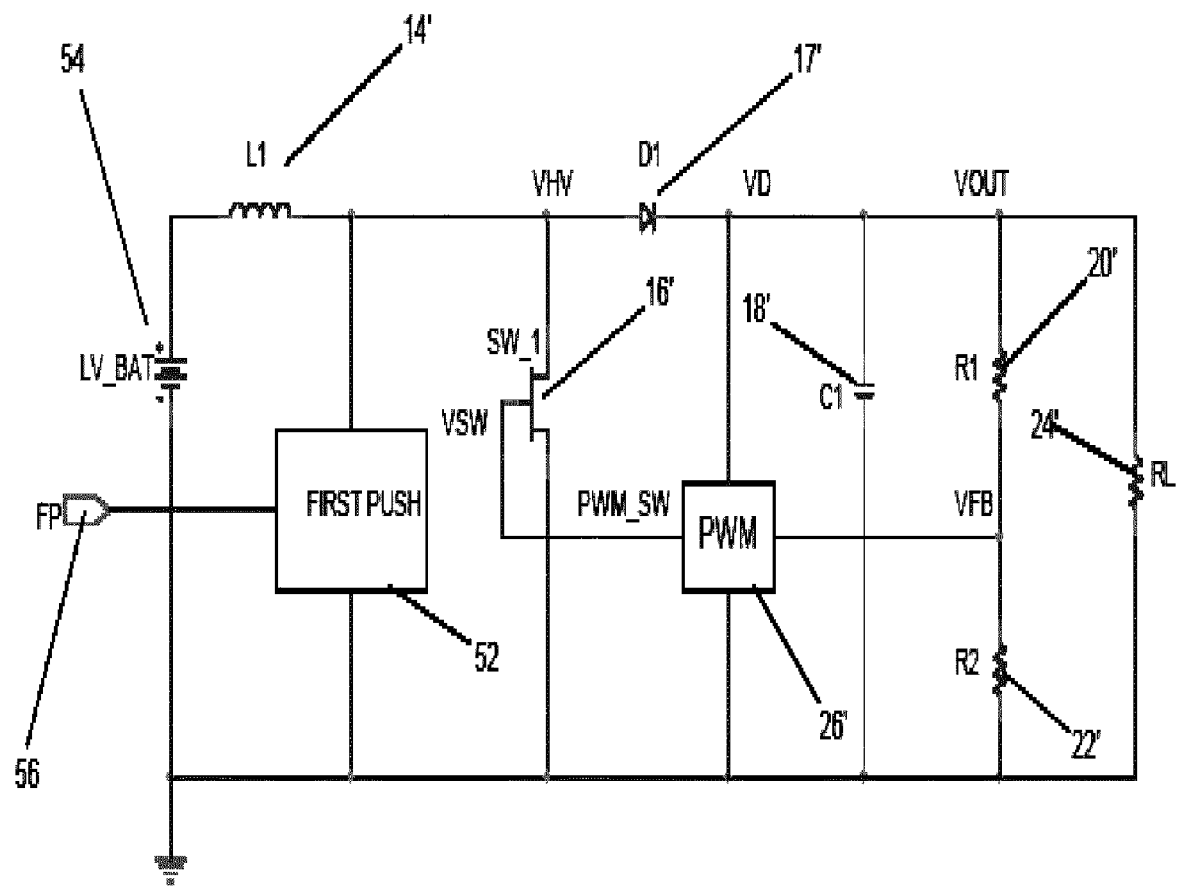
FIG. 2 is a circuit diagram of a boost converter powered by an ultra low power source with a "first push" block in accordance with an embodiment of the invention.

A low voltage converter in accordance with the principles of the invention is shown in FIG. 2. The low voltage converter 50 is similar to the prior art voltage boost converter shown in FIG. 1 with the exception that a "first push" block 52 is connected between the inductor L1 and GND and the high voltage power source (HV_BAT) is replaced by a low voltage power source (LV_BAT) 54. The low voltage power source is incapable of generating a voltage sufficiently large to cause the switching device (SW_1) 16' to switch. However, the "first push" block that is now included in the circuit is able to provide a "first push" voltage that is of sufficient magnitude to enable SW_1 to switch ON. The ability of the "first push" block to provide the initial voltage allows a low voltage power source to be used. In an embodiment of the invention the LV_BAT can be a single-cell solar panel that produces an output voltage ($V_{LV\_BAT}$) of approximately 0.3V. In another embodiment of the invention a low voltage power source can be used that has an output voltage ($V_{LV\_BAT}$) that is even lower than 0.3V, for example between 0.2V and 0.3V. In another embodiment of the invention, $V_{LV\_BAT}$ can be only slightly above GND, such as above 0.1V and less than 0.2V. In another embodiment of the invention the $V_{LV\_BAT}$ can be between 0.2V and 0.9V.

Operation of Low Voltage Converter

A "first push" block in accordance with the principles of the invention includes a current path through the "first push" block that is controlled by a control input (FP). Referring to FIG. 2, when a first push signal is applied to the input (FP) 56 of the "first push" block 52, the current path created within the "first push" block connects inductor (L1) 14' to GND. When the first push signal is removed from FP, L1 is disconnected from GND. At this moment, because of L1's inductance, the voltage at the junction between L1 and D1 raises to a level that is higher than LV_BAT. The voltage across L1 can be calculated as:

$$V_{L1} = L\Delta i_{MAX}/\Delta t \quad (5)$$

where $V_{L1}$ is the voltage across L1,
L is the inductance of L1,
$\Delta t$ is the time duration that the current path through the "first push" block exists while the first push signal is applied to FP, and
$\Delta i$ is the current flowing from LV_BAT to GND through L1 while the first push signal is applied to FP.

In which, the $\Delta i$ is limited as:

$$\Delta i_{MAX} = V_{LV\_BAT}/R_{ON} \quad (6)$$

where $V_{LV\_BAT}$ is the output voltage of the ultra low voltage power source LV_BAT, and $R_{ON}$ is the resistance of the current path through the "first push" block.

As such, after the first push signal is removed, the total voltage that is seen on the right side of the L1, or the anode of the D1, is given as:

$$V_{HV} = V_{LV\_BAT} + V_{L1} \quad (7)$$

where $V_{HV}$ is the voltage on the anode of D1, $V_{LV\_BAT}$ is the output voltage of the low voltage power source LV_BAT, and $V_{L1}$ is the voltage across L1.

And the voltage on the cathode of the D1, is given as:

$$V_D = V_{HV} - V_{D1} = V_{LV\_BAT} + V_{L1} - V_{D1} \quad (8)$$

where $V_{HV}$ is the voltage on the anode of D1,
$V_{LV\_BAT}$ is the output voltage of the low voltage power source LV_BAT,
$V_{L1}$ is the voltage across L1, and
$V_{D1}$ is the forward voltage drop of the diode D1.

Although $V_{LV\_BAT}$ can be ultra low, such as 0.3V from a single-cell solar panel, the $V_{L1}$ can be high depending upon the value of L1, how long ($\Delta t$) FP signal stays on, and the magnitude of the current that flows through L1 while the FP signal is ON. When the signal is removed from FP, $V_D$ can be high enough to activate the PWM block and the voltage of the output PWM signal's ON state ($V_{SW}$) will be at a value that can switch SW_1 ON. The actual value of $V_D$ that will enable the output of the PWM to switch SW_1 ON typically depends upon the nature of SW_1.

Low voltage converters that include different types of switching devices in accordance with the principles of the invention are considered below.

N-Channel Enhancement Mode MOSFETs and NPN Transistors

If SW_1 is an N-channel enhancement mode MOSFET or a NPN transistor, when the first PWM pulse (PWM_SW1) arrives at the control terminal of SW_1, its voltage during the ON state (PWM logic HIGH), $V_{SW}$, must be higher than GND by $V_{TH}$ to switch on the SW_1. Since the voltage of PWM_SW1's ON state cannot be higher than $V_D$ (i.e. the voltage used to power the PWM block), $V_D$ must be higher than GND by $V_{TH}$. The following formula gives the condition that must be satisfied in order to switch on SW_1 for the first time:

$$V_D > V_{TH} \quad (9a)$$

$$\rightarrow V_{HV} - V_{D1} > V_{TH} \quad (9b)$$

$$\rightarrow V_{LV\_BAT} + V_{L1} - V_{D1} > V_{TH} \quad (9c)$$

$$\rightarrow V_{LV\_BAT} + L\Delta i_{MAX}/\Delta t - V_{D1} > V_{TH} \quad (9d)$$

$$\rightarrow L\Delta i_{MAX}/\Delta t > V_{TH} + V_{D1} - V_{LV\_BAT} \quad (9e)$$

According to Equation 9e, appropriate selection of the inductance value of L1, the duration of the first push signal applied to FP, and the current flowing through the "first push" block while the FP signal is applied to its control terminal, can produce a voltage sufficient to turn on SW_1.

For example, if $V_{TH}$ is 0.7V, $V_{D1}$ is 0.7V, and $V_{LV\_BAT}$ is 0.3V, Equation 9e becomes:

$$\rightarrow L\Delta i_{MAX}/\Delta t > V_{TH} + V_{D1} - V_{LV\_BAT} = 0.7V + 0.7V - 0.3V = 1.1V \quad (9f)$$

$$\rightarrow L(V_{LV\_BAT}/R_{ON})/\Delta t > 1.1V \quad (9g)$$

From Equation 9f, if L1 is a 100 µH inductor, and Δt is 100 µs, then a $\Delta i_{MAX}$ that is higher than 1.1 A can turn SW_1 ON. To achieve a $\Delta i_{MAX}$ that is higher than 1.1 A, Equation 9g indicates that $R_{ON}$ (i.e. the resistance of the current path through the "first push" block) should be less than roughly 270 mΩ. Implementations of various "first push" blocks that possess resistances of this order of magnitude are discussed below.

P-Channel Enhancement Mode MOSFETs and PNP Transistors

If the SW_1 is a P-channel enhancement mode MOSFET or a PNP transistor, when the first PWM pulse (PWM_SW) arrives at the control terminal of SW_1, its voltage ($V_{SW}$) during the ON state (PWM logic LOW) must be lower than the $V_{HV}$ by $V_{TH}$ to switch SW_1 ON. Since $V_{SW}$ cannot be lower than GND, the $V_{HV}$ must be at least $V_{TH}$ higher than GND. The following formula gives the condition that must be satisfied in order to switch on SW_1 for the first time:

$$V_{HV} > V_{TH} \quad (10a)$$

$$\rightarrow V_{LV\_BAT} + V_{L1} > V_{TH} \quad (10b)$$

$$\rightarrow V_{LV\_BAT} + L\Delta i_{MAX}/\Delta t > V_{TH} \quad (10c)$$

$$\rightarrow L\Delta i_{MAX}/\Delta t > V_{TH} - V_{LV\_BAT} \quad (10d)$$

Equation 10d indicates that appropriate selection of the inductance of L1, the duration of the first push signal applied to FP, and the current flowing through the "first push" block while the signal is applied to FP can result in SW_1 being turned ON.

For example, if $V_{TH}$ is 0.7V and $V_{LV\_BAT}$ is 0.3V, Equation 10d becomes:

$$\rightarrow L\Delta i_{MAX}/\Delta t > V_{TH} - V_{LV\_BAT} = 0.7V - 0.3V = 0.4V \quad (10e)$$

$$\rightarrow L(V_{LV\_BAT}/R_{ON})/\Delta t > 0.4V \quad (10f)$$

If L1 is a 100 µH inductor, Δt is 100 µs, then according to Equation 10e, a $\Delta i_{MAX}$ higher than 400 mA can result in SW_1 turning ON. A $\Delta i_{MAX}$ higher than 400 mA can be achieved provided $R_{ON}$ is less than roughly 750 mΩ.

As such, the output voltage of the LV_BAT ($V_{LV\_BAT}$) does not have a decisive impact on the SW_1's first switch ON. Selection of L1, Δt, and $R_{ON}$ in accordance with the principles of the invention can enable SW_1 to switch ON for very low values of $V_{LV\_BAT}$. Hence, $V_{LV\_BAT}$ can be ultra low and to the level of only slightly higher than the GND, and SW_1 does not have to be a low threshold voltage switch manufactured using a low threshold voltage semiconductor process.

After the first switch on, SW_1 starts operating like a normal switch that is used in a typical boost converter, and the boost converter in FIG. 2 starts operating like a typical boost converter, except that, the power source (LV_BAT) is allowed to have a ultra low output voltage.

Implementation of "First Push" Block

In FIG. 2, the "first push" block includes a zero-threshold-voltage switching device that can be turned on with a zero voltage applied to FP. Turning the zero-threshold-voltage switch on once provides the "first push," which subsequently jump starts the rest of the boost converter. Various implementations of "first push" blocks that include zero-threshold-voltage switching devices in accordance with the principles of the invention are discussed below. Although specific embodiments are discussed, "first push" blocks can be implemented in other ways that achieve a device that can create a sufficiently low resistance current path in response to the application of a first push signal to a control input.

A "First Push" Block Including a Zero-Threshold-Voltage Mechanical Switch

Figure 3:
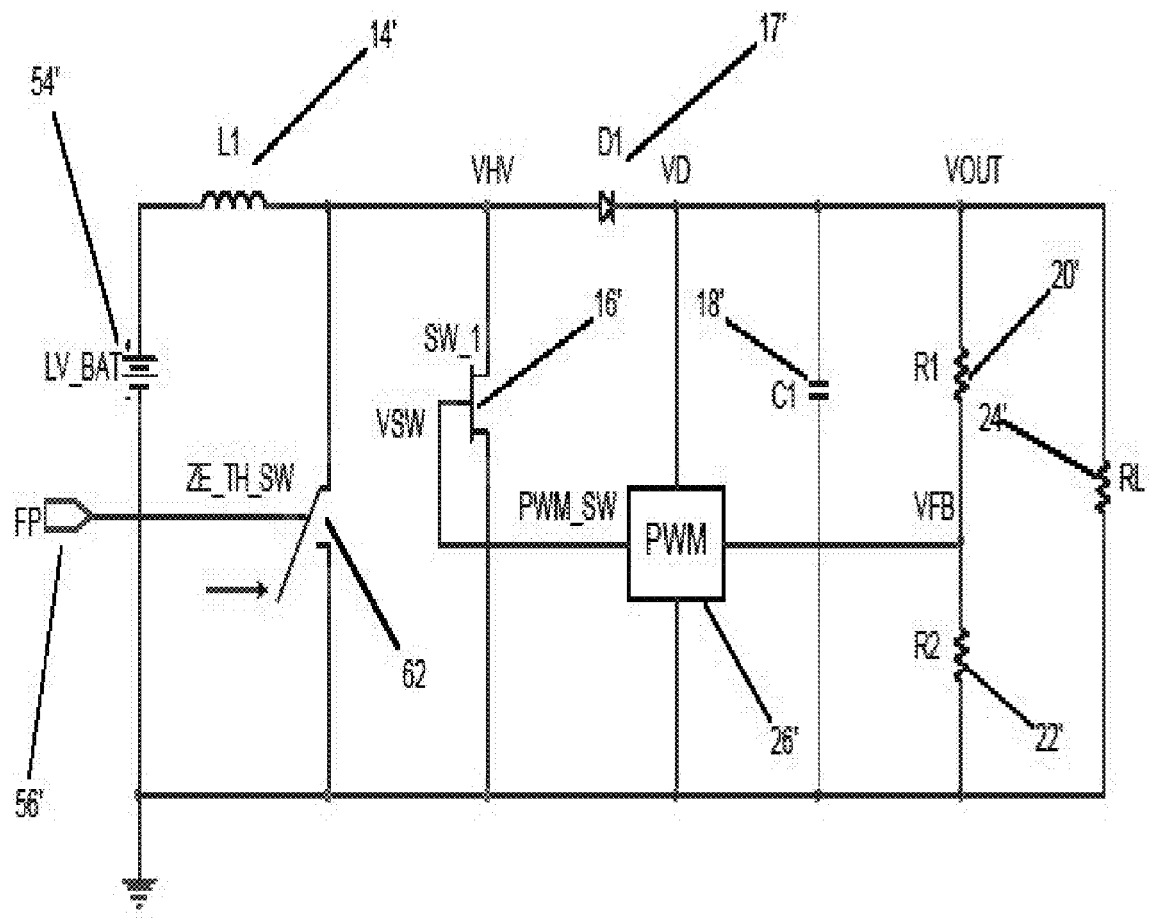
FIG. 3 is a circuit diagram of a low voltage converter that includes a zero-threshold-voltage switch as a "first push" block in accordance with an embodiment of the invention.

A low voltage converter that includes a "first push" block implemented using a zero-threshold-voltage switch in accordance with an embodiment of the invention is shown in FIG. 3. The low voltage converter 60 includes a "first push" block that is implemented using a zero-threshold-voltage switch (ZE_TH_SW) 62 that is connected between L1 14' and GND. In the illustrated embodiment, ZE_TH_SW is a mechanical switch that, when a physical pressure is applied to the input FP, is turned ON, and after the physical pressure is removed, is turned OFF.

Figure 4:
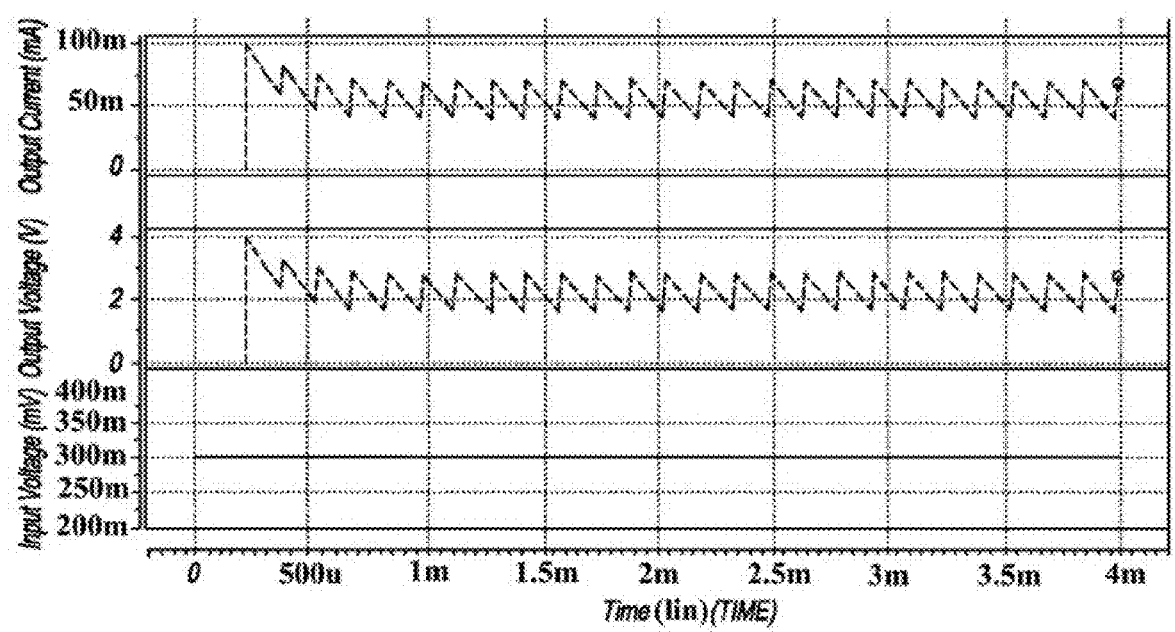
FIG. 4 is a chart showing a simulation of the response of a low voltage converter in accordance with an embodiment of the invention.

A chart of a simulation of the low voltage converter 60 illustrated in FIG. 3 is shown in FIG. 4. The chart shows current through L1 building as ZE_TH_SW is turned ON at time 0. When ZE_TH_SW is released, the voltage across L1 is sufficient for the PWM to generate a signal that causes SW_1 to commence switching. At which point, the low voltage converter settles into steady state operation. The output voltage can include "ripples" associated with the voltage regulator regulating the output voltage. The ripples can be "smoother" if a larger output capacitor is used.

A "First Push" Block Including a Zero-Threshold-Voltage Photo-Coupling Switch

Figure 5:
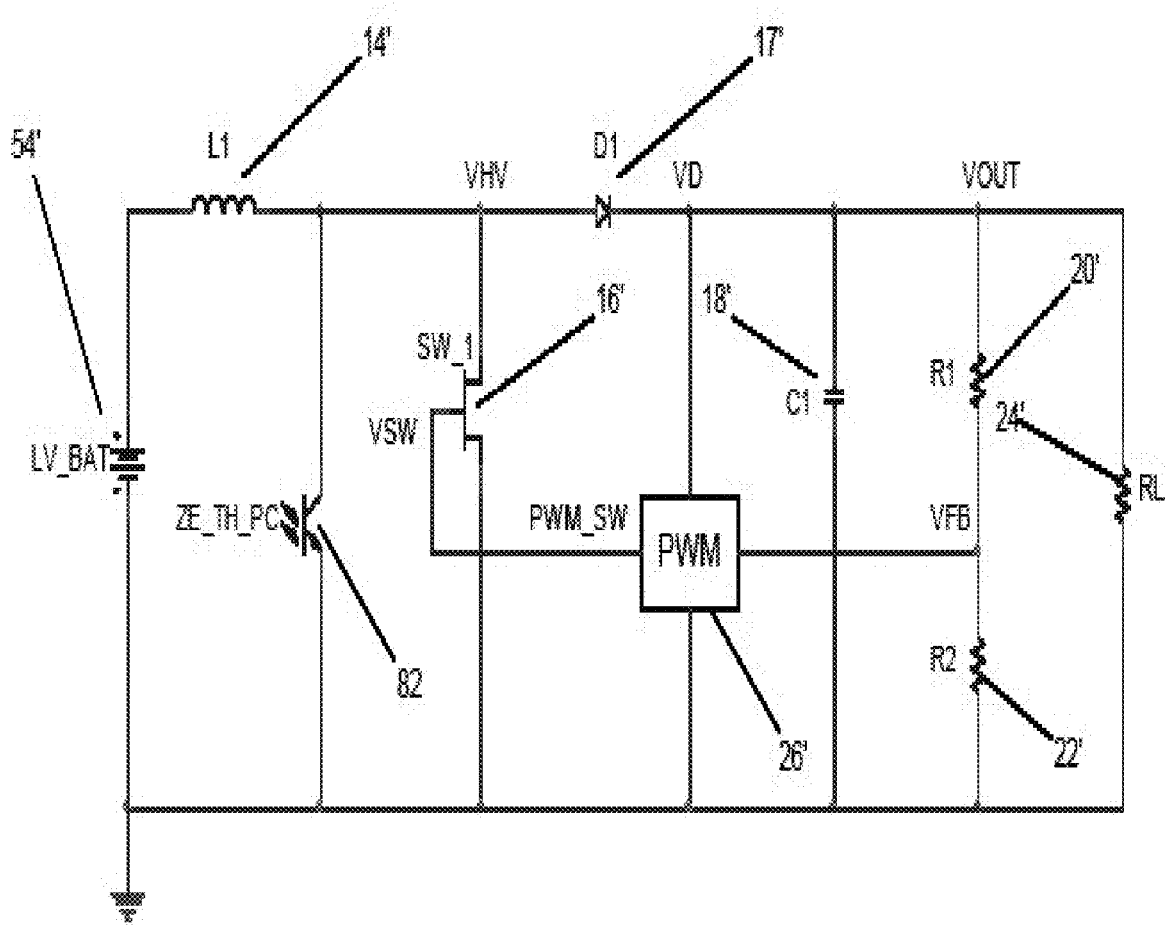
FIG. 5 is a circuit diagram of a low voltage converter that utilizes a photo-coupler as a "first push" block in accordance with an embodiment of the invention.

A low voltage converter that includes a "first push" block implemented using a photo-coupling switch is shown in FIG. 5. The low voltage converter 80 includes a "first push" block implemented using a a zero-threshold-voltage photo-coupler (ZE_TH_PC) 82. In the illustrated embodiment, ZE_TH_PC is an optoelectrical switch that, when it is activated by an optical signal, is turned ON and, after the optical signal is removed, is turned OFF. A sufficiently long application of an optical signal to the optoelectrical switch enables L1 to store sufficient energy to enable the PWM to switch SW_1 ON.

The internal resistance of a photo coupler can be comparable to that of a non-zero resistance switch. As long as the intensity of the light is sufficient, the optoelectrical switch will be turned on, and as long as it can be turned on, its threshold voltage is no longer important. In embodiments where an optoelectrical switch is used, an important design parameter is, how high the intensity of the light source has to be to turn it on the very first time.

A "First Push" Block Including an Active Component

Figure 6:
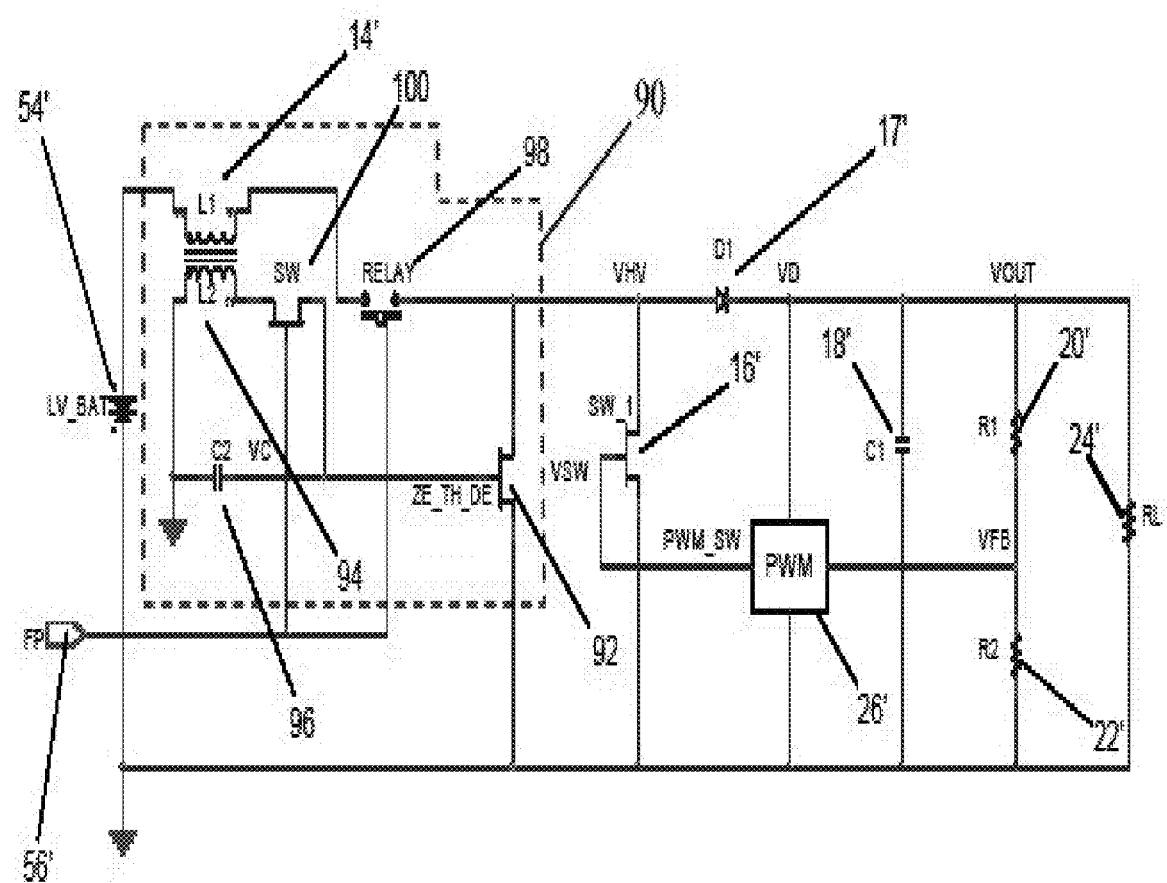
FIG. 6 is a circuit diagram of a low voltage converter that uses a zero-threshold-voltage depletion mode MOSFET and a control circuit as a "first push" block in accordance with an embodiment of the invention.

A low voltage converter 91 that includes an active component in accordance with an embodiment of the invention is shown in FIG. 6. The low voltage converter 90 includes a depletion mode MOSFET switch (ZE_TH_DE) 92, and a control circuit that includes a transformer with L1, 14' as a primary coil and L2, 94 as a secondary coil, a capacitor (C2) 96 connected between the grounded terminal of L2 and the control input of ZE_TH_DE, a once-pressed-always-on RELAY 98 connected between L1 and D1, and a switch (SW) 100 that is on if a physical pressure is on and off when the physical pressure is removed that is connected between the other terminal of L2 and the control input of ZE_TH_DE. Both the RELAY and SW are controlled by the control input FP, 56'. When the voltage ($V_G$) applied to the control terminal (Gate) of ZE_TH_DE is higher than its negative threshold voltage ($-V_{TH}$), then ZE_TH_DE is ON. As such, it can only be turned off when a negative voltage, of which the absolute value is higher than $|V_{TH}|$ (more negative than $V_{TH}$), is applied to its control terminal.

When the RELAY is turned ON (and stays ON) L1 is connected to the GND through ZE_TH_DE, which was ON prior to the RELAY being turned ON. SW is also turned on, which connects L2 to C2. The current in L1 and, because L2 has the same polarity as L1, the current induced in L2 flows in the opposite direction charging C2. Since the left side of C2 is connected to GND, the voltage ($V_C$) at the side connected to the control input of ZE_TH_DE becomes negative. When the pressure on SW is removed, SW is turned OFF, and L2 is disconnected from the rest of the circuit. Since there is no path for C2 to discharge, $V_C$ stays the same. Depending on the values of the L2 and C2, and the duration of the FP applied to SW, $V_C$ can be "negative" enough to turn ZE_TH_DE OFF, and make it stay OFF. After ZE_TH_DE is OFF, L1 is disconnected from GND. If at that time $V_{HV}$ satisfies either Equation 9b or 10a, SW_1 is switched on by the PWM 26' for the first time and a sustainable boost conversion is created.

A "First Push" Block Used in an Isolated Topology

Figure 7:
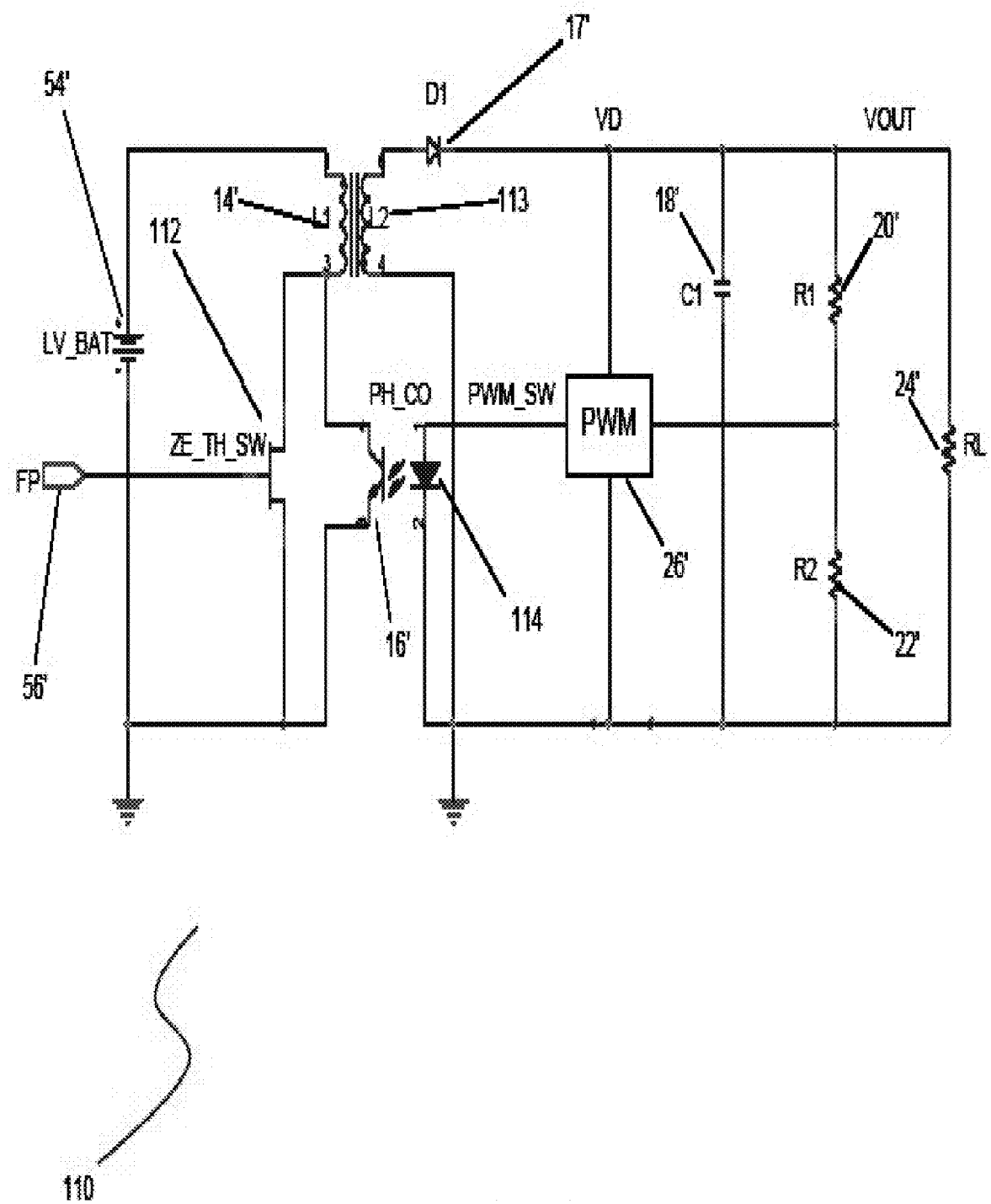
FIG. 7 is a circuit diagram of a low voltage converter that uses a flyback topology in accordance with an embodiment of the invention.

Voltage converters that provide galvanic isolation between an input power source and the output of the voltage converter are useful in a variety of applications. A low voltage converter that includes galvanic isolation between the low voltage power source and the output of the voltage converter in accordance with an embodiment of the invention is illustrated in FIG. 7. The low voltage converter 110 uses a flyback topology. In the illustrated embodiment, LV_BAT, 54', L1, 14', and ZE_TH_SW 112 are connected in series. A photo-coupling switch (SW_1) 16', such as an optocoupler, is connected between the terminal of L1 that is connected to ZE_TH_SW, and GND. L1 and a second inductor (L2) 113 are windings of a transformer. L2 is connected between D1 17' and GND. The PWM 26' is not physically connected to the control input of SW_1. Instead, the PWM 26' is connected to a light emitting device 114, such as an LED. The optical coupling between the LED, 114 and SW_1, 16' enables the PWM to turn SW_1 ON.

Application of a first push input to the control input (FP) of ZE_TH_SW 112 causes energy to collect on L1. When FP is released, a current is induced in L2 and the magnitude of the induced current determines the potential at the terminal of L2 connected to D1. When the voltage at the terminal of L2 connected to D1 is sufficiently large, the PWM is capable of activating the LED and switching ON SW_1.

Figure 8:
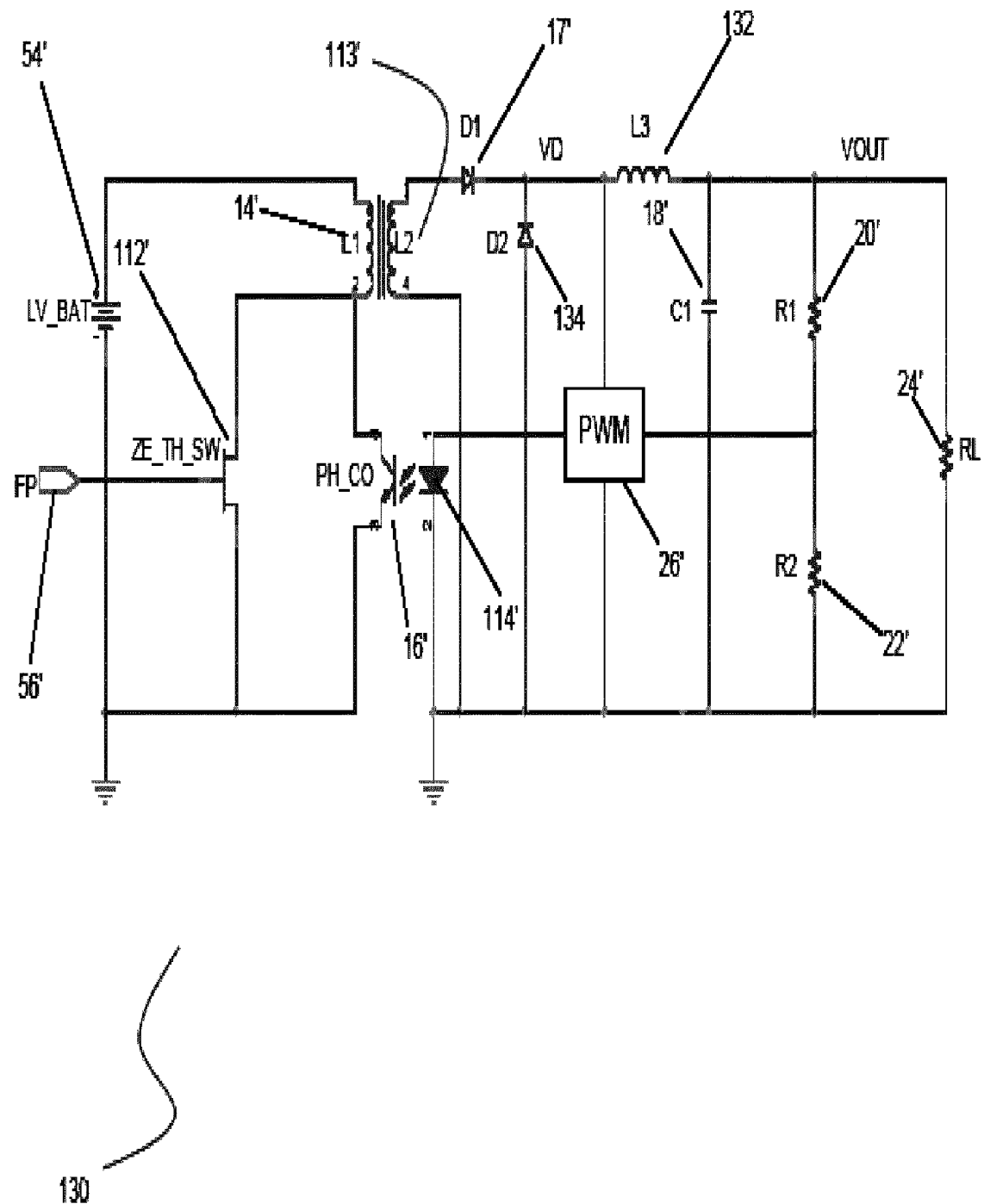
FIG. 8 is a circuit diagram of a low voltage converter that uses a forward topology in accordance with an embodiment of the invention.

Another low voltage converter that includes galvanic isolation between the low voltage power source and the output of the voltage converter in accordance with an embodiment of the invention is illustrated in FIG. 8. The voltage converter 130 uses a forward topology, which uses similar galvanic isolation techniques to those illustrated in FIG. 7. However, D1 is connected to the load via a third inductor (L3) 132 and ground via a second diode (D2) 134.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. In a boost DC/DC power converter having a low voltage source, an inductor and a switching device coupled to form a series loop wherein the junction of the low voltage battery and switching device is coupled to a ground; a diode in series with a capacitor coupled across said switching device;
    a voltage divider coupled across the capacitor; and
    a pulse width modulator coupled across the voltage divider to receive power and to the voltage divider to receive an input from the voltage divider to provide an input to a control terminal of the switching device, said converter comprising:
        a first push controller coupled across said switching device,
    wherein said low voltage source by itself is not capable of generating a voltage of sufficient magnitude to operate the switching device, and
        wherein the first push circuit provides a first push voltage of sufficient magnitude to turn the switching device on.

2. The device of claim 1 wherein the low voltage source is a single cell solar panel.

3. The device of claim 2 wherein the single cell solar panel generates a potential of approximately 0.3 volts.

4. The device of claim 1 wherein the low voltage source has a potential of between 0.2 volts and 0.9 volts.

5. The device of claim 1 wherein the low voltage source has a potential of between 0.1 volts and 0.3 volts.

6. The device of claim 1 wherein the switching device is an N-channel enhancement mode MOSFET or an NPN transistor.

7. The device of claim 1 wherein the switching device is a P-channel enhancement mode MOSFET or a PNP transistor.

8. The device of claim 1 wherein the first push controller is a zero threshold voltage switching device.

9. The device of claim 8 wherein the zero threshold voltage switching device is a mechanical switch.

10. The device of claim 9 wherein the mechanical switch is turned on when a physical pressure is applied and is turned off when the physical pressure is removed.

11. The device of claim 8 wherein the zero threshold voltage switching device is a photo coupler.

12. The device of claim 11 wherein the photo coupler is an optoelectrical switch that is turned on when activated by an optical signal and is turned off when the optical signal is removed.

13. The device of claim 1 wherein the first push controller is a low voltage converter that includes an active component.

14. The device of claim 13 wherein the low voltage converter comprises a depletion mode MOSFET switch coupled in parallel with the switching device and having a control terminal coupled in series with a capacitor to ground, a transformer having a secondary winding coupled is series with a manually operated switch located between the control terminal of the MOSFET switch and the ground, and a primary winding of the transformer located between the low voltage source and the MOSFET switch through contacts of a relay.

15. The device of claim 1 wherein galvanic isolation is provide between the low voltage source and the output of the power converted.

16. The device of claim 15 wherein the pulse width modulator is activated by a light emitting diode that separates the pulse width modulator from the control input of the switching device.

* * * * *